United States Patent
Resh et al.

(10) Patent No.: US 6,215,627 B1
(45) Date of Patent: Apr. 10, 2001

(54) SUSPENSION ASSEMBLY GIMBAL LOAD BEAM STIFFENER

(75) Inventors: Roger A. Resh, Prior Lake; Adam K. Himes, Richfield, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/083,217

(22) Filed: May 22, 1998

Related U.S. Application Data

(60) Provisional application No. 60/063,612, filed on Oct. 27, 1997.

(51) Int. Cl.[7] .................................................. G11B 5/48
(52) U.S. Cl. .............................................. 360/245.6
(58) Field of Search ............................ 360/104–106, 360/245.6, 245.7, 245.8

(56) References Cited

U.S. PATENT DOCUMENTS

| | | | |
|---|---|---|---|
| H1424 | * | 4/1995 | Budde .................................. 360/104 |
| H1573 | * | 8/1996 | Budde .................................. 360/104 |
| 5,115,363 | | 5/1992 | Khan et al. . |
| 5,612,841 | * | 3/1997 | Johnson .............................. 360/104 |
| 5,748,409 | * | 5/1998 | Girard et al. ........................ 360/104 |
| 5,754,368 | * | 5/1998 | Shiraishi et al. .................... 360/104 |
| 5,812,343 | * | 9/1998 | Budde et al. ........................ 360/104 |
| 5,875,070 | * | 2/1999 | Khan et al. .......................... 360/104 |
| 5,880,908 | * | 3/1999 | Shiraishi et al. .................... 360/104 |

* cited by examiner

Primary Examiner—Allen T. Cao
(74) Attorney, Agent, or Firm—Westman, Champlin & Kelly, P.A.

(57) ABSTRACT

A disc drive includes a spindle motor, a spindle, a disc, control circuitry, an actuator, and an armature. The spindle motor is coupled to the spindle to which the disc is also coupled. The control circuitry is coupled to the actuator and provides the actuator with control signals. The armature includes a load beam coupled to the actuator such that energization of the actuator displaces the load beam. The gimbal is coupled to the head and is also coupled to the load beam by a plurality of spaced apart attachment points. An interconnect operably couples the head to the control circuitry.

15 Claims, 6 Drawing Sheets

FIG. 8
Design Characteristics

| | | C1, 7 | | C2, 8 | | C3, 9 | | C4, 10 | | C5, 11 | | C6, 12 | |
|---|---|---|---|---|---|---|---|---|---|---|---|---|---|
| Configuration Label | | C1 | C7 | C2 | C8 | C3 | C9 | C4 | C10 | C5 | C11 | C6 | C12 |
| Load Beam Thickness | (micron) | 63.5 | 50.8 | 63.5 | 50.8 | 63.5 | 50.8 | 63.5 | 50.8 | 63.5 | 50.8 | 63.5 | 50.8 |
| Lift Tab? | (yes/no) | yes | yes | no | no | yes | yes | no | no | yes | yes | no | no |
| Mass Reduction Feature | | none | none | none | none | through hole | through hole | through hole | through hole | partial etch | partial etch | partial etch | partial etch |
| Mass and Inertia | | | | | | | | | | | | | |
| Mass | (mg) | 58.1 | 52.5 | 57.7 | 52.2 | 54.0 | 49.3 | 53.7 | 49.0 | 55.6 | 50.6 | 55.3 | 50.3 |
| Inertia About Pivot | (g-mm²) | 64.1 | 57.2 | 63.4 | 56.7 | 58.5 | 52.8 | 57.8 | 52.3 | 60.7 | 54.6 | 60.0 | 54.0 |
| Modal Frequencies | | | | | | | | | | | | | |
| First Bending | (kHz) | 2.20 | 1.99 | 2.21 | 1.99 | 2.52 | 2.30 | 2.53 | 2.31 | 2.36 | 2.14 | 2.37 | 2.15 |
| First Torsion | (kHz) | 3.72 | 3.13 | 3.90 | 3.27 | 3.56 | 3.05 | 3.76 | 3.22 | 3.56 | 3.04 | 3.76 | 3.21 |
| Second Bending | (kHz) | 5.52 | 4.73 | 5.59 | 4.79 | 5.93 | 5.05 | 6.00 | 5.11 | 5.65 | 4.82 | 5.72 | 4.88 |
| Second Torsion | (kHz) | 8.14 | 6.69 | 9.99 | 8.22 | 7.95 | 6.54 | 9.31 | 7.72 | 7.96 | 6.54 | 9.43 | 7.80 |
| Third Bending | (kHz) | 12.0 | 10.6 | 12.2 | 10.8 | 11.8 | 10.3 | 12.0 | 10.5 | 11.6 | 10.2 | 11.8 | 10.4 |
| Static Acceleration | | | | | | | | | | | | | |
| Head/Disc Separation | (G/gmf) | 115 | 133 | 120 | 138 | 134 | 154 | 141 | 161 | 126 | 145 | 132 | 151 |

SUSPENSION ASSEMBLY GIMBAL LOAD BEAM STIFFENER

CROSS-REFERENCE TO RELATED APPLICATION

This application claims the priority of an earlier filed co-pending provisional application Serial No. 60/063,612, filed Oct. 27, 1997, entitled "SUSPENSION ASSEMBLY GIMBAL LOAD BEAM STIFFENER," herein incorporated by reference.

FIELD OF THE INVENTION

The present invention relates to disc drive storage devices. More specifically, the present invention relates to an improved disc drive suspension assembly.

BACKGROUND OF THE INVENTION

Disc drives are the primary mass data storage devices used in modern computers. Within disc drives, one or more discs store data on their surfaces. Data may be stored magnetically, optically, or through a combination of both methods. The storage discs are rotated while heads, carrying appropriate transducers fly just above the disc surfaces. The heads fly in such close proximity to the disc surfaces that the transducers optically or magnetically couple to the disc surfaces to either read data from or write data to the discs.

In disc drives, the head flight is a very important design characteristic. If the head flies too far away from the disc surface the resolution with which the head couples data to the disc surface will be decreased. Alternatively, if the head flies too close to the disc surface, it may actually crash into the disc surface thereby damaging the disc, the head, or both. To further complicate the issue, disc surfaces are generally not entirely free from defects, and are not always perfectly flat. As a result, the head will be required to pitch and roll with the topography of the rotating disc throughout flight. However, in order to keep the head on track, in-plane deflection must be minimized during flight. Generally, the heads are coupled to an actuator via a load beam and a gimbal. The gimbal allows the heads to pitch and roll with sufficient compliance, but is also designed to be rigid for in-plane deflection.

The market continually presses disc drive manufacturers to provide greater data capacities and higher data access rates at lower costs. Thus, the art is continually in need of improvements which is increase access speed, and durability, without increasing costs significantly.

SUMMARY OF THE INVENTION

A disc drive includes a spindle motor, a spindle, a disc, control circuitry, an actuator, and an armature. The spindle motor is coupled to the spindle to which the disc is also coupled. The control circuitry is coupled to the actuator and provides the actuator with control signals. The control circuitry is also operably coupled to the head. The armature includes a load beam coupled to the actuator such that energization of the actuator displaces the load beam. The gimbal is coupled to the head and is also coupled to the load beam by a plurality of spaced apart attachment points.

DESCRIPTION OF THE DRAWINGS

FIG. 8 is a table of simulation results for head gimbal assemblies embodying various features of the present invention.

DETAILED DESCRIPTION OF THE PREFERRED EMBODIMENTS

Figure 1:
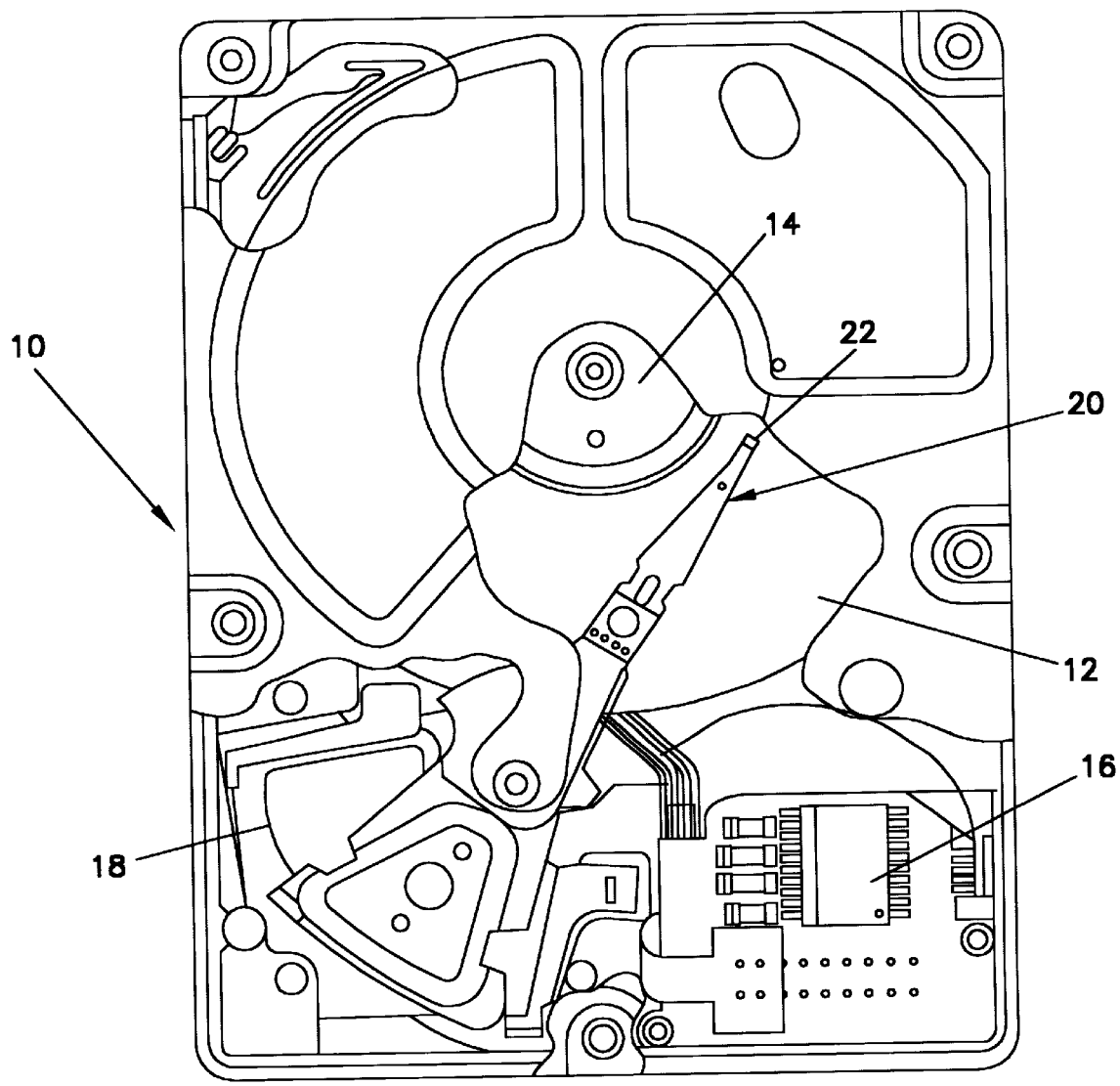
FIG. 1 is a top plan view of a disc drive for which the present invention is particularly useful.

FIG. 1 is a top plan view of disc drive 10 in accordance with the present invention. Disc drive 10 is coupled to a computer (not shown) such that the computer transfers data to and reads data from disc drive 10. Disc drive 10 includes disc 12, spindle 14, control circuitry 16, actuator 18, armature 20, and head 22.

Disc 12 is fixed about spindle 14. Spindle 14 is coupled to a spindle motor (not shown) such that energization of the spindle motor causes spindle 14 and disc 12 to rotate. When disc 12 rotates, head 22 flies above disc 12 and is magnetically or optically coupled to the surface of disc 12. Actuator 18 is coupled to control circuitry 16 and is adapted to rotate armature 20 such that head 22 moves generally radially across the surface of disc 12 in response to an actuation signal from control circuitry 16. In addition to controlling actuator 18, control circuitry 16 is electrically coupled to transducers on head 22 in order to read and write data to the surface of disc 12. As is commonly the case, there are generally more than one disc 12 in a given disc drive 10. For each surface of each disc, there will be corresponding armatures 20 and heads 22.

Figure 2:
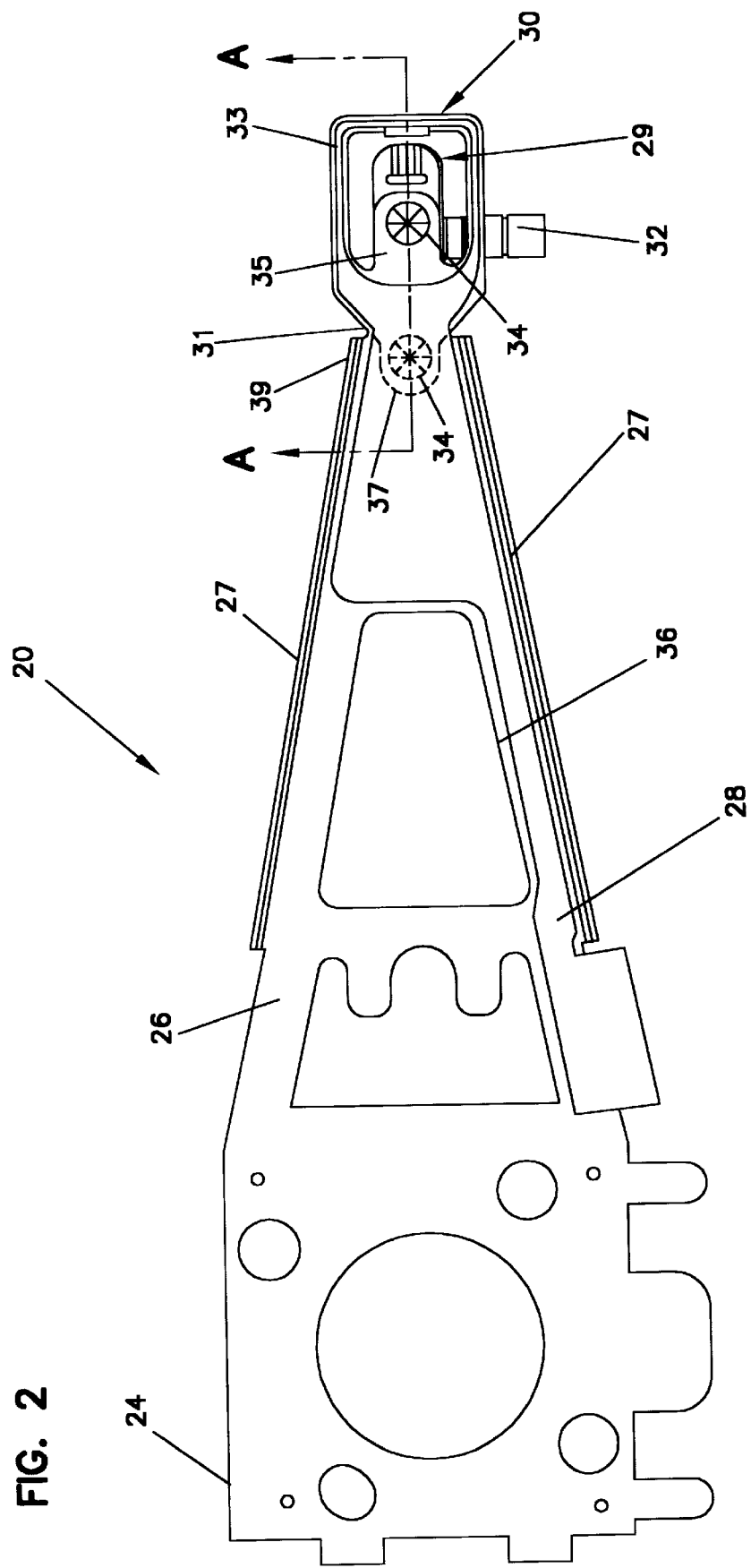
FIG. 2 is a top plan view of an armature in accordance with the present invention.

FIG. 2 is a top plan view of armature 20 in accordance with the present invention. Armature 20 includes actuator attach portion 24, load beam portion 26, interconnect 28 and gimbal portion 30.

Actuator portion 24 of armature 20 includes a plurality of holes which allow actuator portion 24 to couple to actuator 18. Additionally, it should be noted that although the present invention is directed towards enhancements on a rotary-actuated armature, the various features provided herein may be practiced in a disc drive employing linear head actuation.

Load beam portion 26 is preferably formed integral with actuator portion 24. Further, load beam portion 26 preferably has a length of about 0.600 inches. Additionally, it is also preferred that actuator portion 24 and load beam portion 26 are formed from stainless steel. Load beam portion 26 includes a plurality of upturned rails 27 which run along opposite sides of a longitudinal axis of load beam portion 26 to provide enhanced rigidity to load beam portion 26 against bending. Additionally, load beam portion 26 includes mass reducing portion 36. In one embodiment, mass reducing portion 36 is formed by partially etching mass reducing portion 36 such that a selected amount of material is removed, but a certain amount is left behind. In this manner, mass reducing portion 36 provides stability to load beam portion 26 while also providing mass reduction features. In another embodiment, mass reducing portion 36 is formed by completely removing material in mass reducing portion 36. The method of removal is preferably etching. When all material in mass reducing portion 36 is removed, maximum mass reduction may be attained, which reduction allows increased acceleration of armature 20, which thereby improves performance.

Interconnect 28 is disposed on load beam portion 26, and couples head 22 (not shown in FIG. 2) to control circuitry 16. Interconnect 28 may take the form of discrete wires, or a flexible printed circuit as appropriate.

Gimbal 30 is coupled to tongue 29 of armature 20 by a pair of spaced apart attachment points 34 which are preferably stiffener welds. As can be seen in FIG. 2, tongue 29 includes proximal end 31 and distal end 33. Gimbal 30 includes mounting portion 35 which overlaps a portion of tongue 29 between proximal end 31 and distal end 33. Additionally, it can be seen that the spacing of attachment points 34 from one another is longitudinal with respect to load beam 26. By longitudinally spacing attachment points 34, increased stiffening of the gimbal/tongue interface is realized. Stiffener welds 34 are positioned to add 0.00086 inches to the effective section thickness of the interface between tongue 29 and gimbal 30. Additionally, gimbal 30 is truncated which further reduces the effective mass of armature 20. As used herein, "truncated" indicates that the gimbal does not extend substantially up load beam 26, but in fact has a proximal end 37 which is disposed proximate ends 39 of stiffener rails 27. This is in contrast to prior art designs in which the gimbal extends somewhat up the load beam in order to achieve sufficient stiffness. By truncating the gimbal, the present invention is able to realize an effective mass reduction of the entire armature.

As can also be seen in FIG. 2, tongue 29 of armature 20 includes lift tab 32. Lift tab 32 is provided to allow armature 20 to be compatible with dynamic merge or ramp load/unload applications, as are known in the art. However, those skilled in the art will recognize that lift tab 32 is located proximate the base plate (not shown), as compared to the prior art. Further, it should be noted that if armature 20 is not to be used in a dynamic merge application, or ramp load/unload application, lift tab 32 may then be omitted. Such omission provides enhanced mass reduction.

Figure 3:
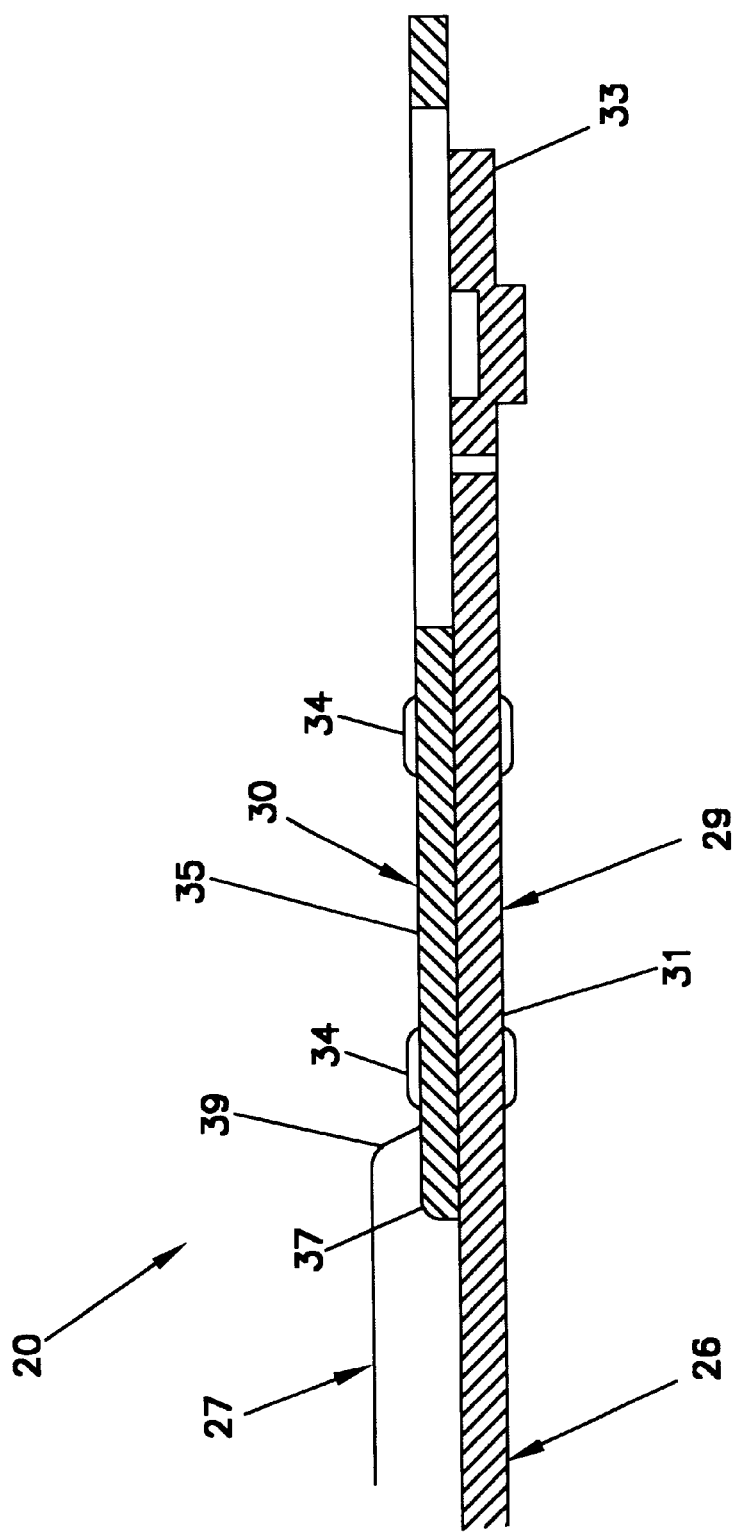
FIG. 3 is a cross-sectional elevation view of a portion of an armature in accordance with the present invention.

FIG. 3 is a cross-sectional elevation view of a portion of armature 20 taken along section A—A in FIG. 2. FIG. 3 shows gimbal 30 disposed on top of tongue 29. However, the present invention expressly contemplates the reverse, in which tongue 29 is disposed on top of gimbal 30. As can also be seen, mounting portion 35 of gimbal 30 overlaps the portion of tongue 29 between proximal end 31 and distal end 33. Additionally, attachment points 34 fix gimbal 30 to tongue 29 in a plurality of locations, which locations are spaced apart from one another in the longitudinal direction of armature 20. Longitudinal spacing of attachment points 34 provides increased bending stiffness to gimbal 30 and tongue 29. The increased stiffness allows gimbal 30 to be truncated such that proximal end 37 of gimbal 30 need not extend substantially past ends 39 of stiffener rails 27.

Figure 4:
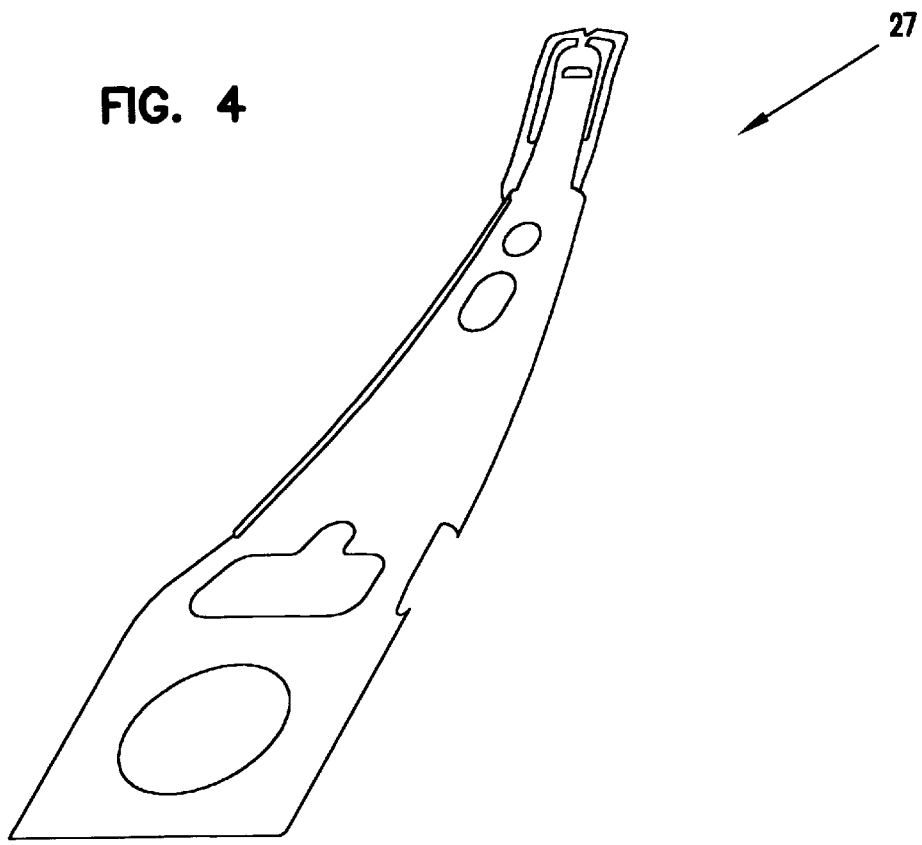
FIGS. 4, 5, 6 and 7 are bottom perspective views of a typical armature in respective first bending, first torsion, second bending and second torsion modes.
Figure 5:
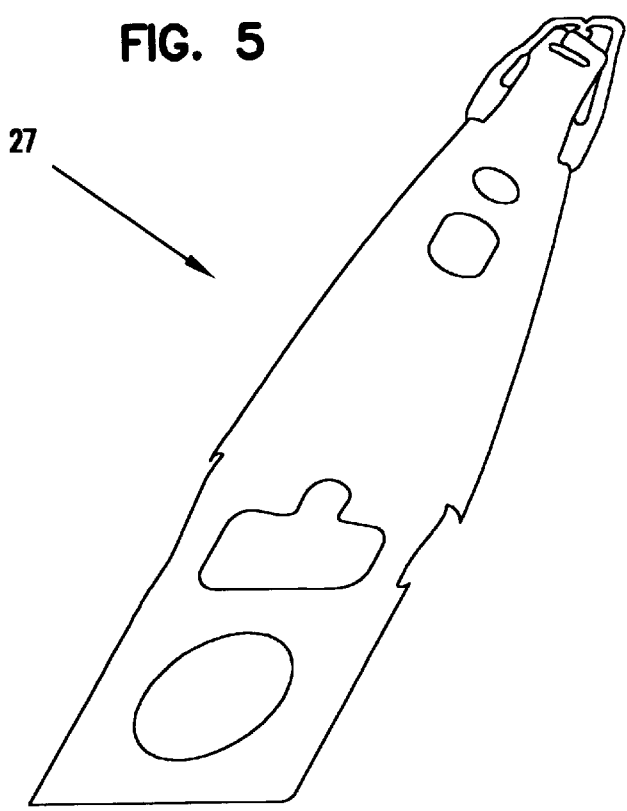
Figure 6:
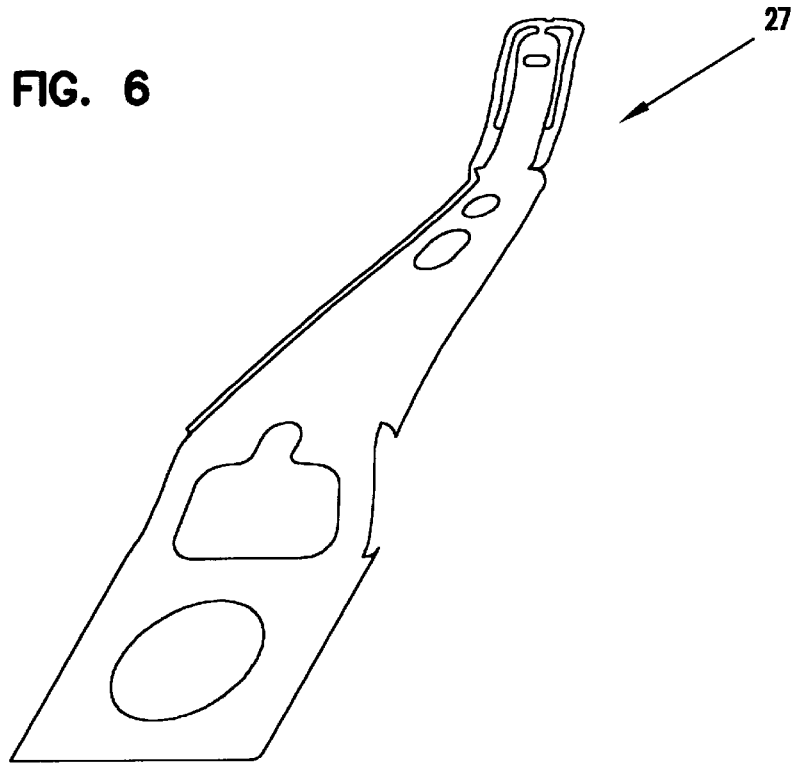
Figure 7:
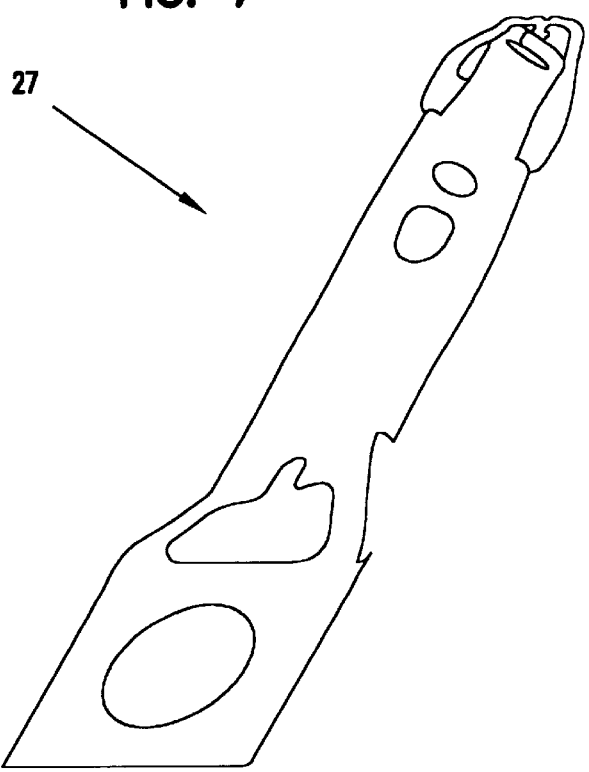

The present invention was realized after the completion of an advanced armature development simulation. In order to understand the relevance of the development simulation, it is necessary to first discuss some background with respect to armature deformations. FIGS. 4 through 7 illustrate various modes in which armature 27 may be deformed. FIG. 4 shows a first bending mode. FIG. 5 shows armature 27 in a first torsion mode. FIG. 6 shows armature 27 in a second bending mode and FIG. 7 shows armature 27 in a second torsion mode.

Armatures often have different resonance frequencies depending on the flexure modes as shown in FIGS. 4 through 7. It is desirable to maintain resonance frequencies of the armature as high as possible in all modes so that the mechanical system of the armature can not be caused to resonate by ordinary seeking and tracking operations. A high natural resonance frequency is desirable so that ordinary seeking and tracking functions do not cause the armature to go into resonance. It is further known that increasing compliance causes a significant decrease in resonant frequency. Thus, although the increased compliance allows a head to more closely track the topography of a rotating disc, the lower resonant frequency increases the probability that ordinary seeking and tracking functions will cause the armature to resonate. The advanced armature development simulation measured mass and inertia, modal frequencies, and static acceleration parameters in response to variations in load beam thickness, mass reduction features, and the presence of lift tabs.

FIG. 8 is a chart of the advanced armature development simulation results. The simulation results identify the impact of lift tab and mass reduction features on inertia, frequency response, and static acceleration head/disc separation. The simulation indicates that the lift tab most significantly degrades the second torsion frequency of the armature (10 kHz drops to 8.1 kHz) incorporating a 2.0 mil (50.8 microns) thick load beam further degrades the frequency to around 6.7 kHz. Primarily for these reasons, it is recommended that the ramp load/unload configuration (which requires the lift tab feature) utilize the 2.5 mil (63.5 microns) thick load beam. As can be seen in FIG. 8, using a 2.5 mil thick load beam, as compared to a 2.0 mil thick load beam, reduces the head/disc separation. However, because the head is not in contact with the disc during non-operating shock, the relatively low head/disc separation is irrelevant. Similarly, mass associated with a flex circuit head interconnect assembly is not believed to impact non-operating shock performance. Although inertia of such an armature will be larger than other options, it is expected to have a small impact on the overall actuator inertia. The configuration employing the 2.5 mil thick load beam and the lift tab, is labeled C1 in FIG. 8. This is the preferred embodiment for ramp load/unload configurations.

For non-ramp load/unload configurations, the lift tab is not required. Thus, the preferred configuration for the non-ramp load/unload configuration incorporates a 2.0 mil thick load beam and a mass reducing portion. The removal of the lift tab maintains fairly high first and second torsion modal frequencies. An additional benefit of the mass reducing portion is the increase in the armature first bending frequency, which should provide separation between this mode and the actuator arm first bending mode. This configuration is labeled C10 in FIG. 8. Finally, if modal damping is critical, the use of a flex circuit head interconnect, C12 in FIG. 8, would be recommended.

In performing the above-described advanced armature development simulation, the following features were held constant. All configurations included the same exact head. Additionally, all configurations included a 6 mil flange/10.5 mil boss microswage base plate. Further, none of the configurations included an electrical interconnect (for evaluation purposes). Additionally, all configurations in the simulation included displacement limiters. Finally, a pivot to gap length of 1.80 inches was used for drive inertia calculations.

The simulation results included inertia calculations, and finite element simulations which are included in FIG. 8. For configuration C1 in FIG. 8, the mass and inertia contributions were (for a 3 inch drive):

|  | Mass | Inertia |
|---|---|---|
| Load Beam | 48% | 53% |
| Gimbal | 1 | 2 |
| Swage Plate | 48 | 39 |
| Slider | 3 | 5 |

Modal frequencies dropped with the introduction of the lift tab and the reduction in load beam thickness. Such reductions in modal frequencies may not be critical for configurations in which flex circuit head interconnects are used (all but configurations C3, C4, C9 and C10 in FIG. 8) when off-track modes are considered (first and second torsion). Degradation in the first bending modal frequency is undesirable, as this mode is related to head slap, for which modal damping is not expected to play a significant role. It should be noted however that all of the frequencies measured in the advanced armature simulation were generally significantly higher than E-block bending modes (800 Hz–1.4 kHz).

The static acceleration required for head/disc separation significantly improved for the lowest mass configuration, C10 in FIG. 8. Additionally, the mass reducing portion 36 (shown in FIG. 2) increased the first bending modal frequency, which is believed to be a benefit when E-block/armature interactions are considered. For reference, recent testing of an IBM Travelstar VP drive indicated a head/disc separation of around 190 G. Even assuming a fairly stiff arm design, a 3.0 gmf preload should easily surpass this value for a 2.5 inch drive. Having thus performed the above advanced armature development simulation, a couple of embodiments emerged as superior. For both embodiments, a truncated gimbal and stiffener welds are preferred. For ramp load/unload applications, a 2.5 mil thick reduced length load beam without mass reduction features incorporating a lift tab, and a flex circuit head interconnect, is preferred. For non-ramp load/unload applications, the preferred configuration is a 2.0 mil reduced length load beam incorporating a mass reducing portion, and not having a lift tab. Finally, the interconnect for the present invention may be effected with wires, a flex circuit, or a laminated gimbal structure.

Although the present invention has been described with reference to preferred embodiments, workers skilled in the art will recognize that changes may be made in form and detail without departing from the spirit and scope of the invention.

What is claimed is:

1. A disc drive comprising:
 a spindle motor;
 a spindle coupled to the spindle motor;
 a disc coupled to the spindle for rotation therewith;
 control circuitry disposed within the disc drive;
 an actuator coupled to the control circuitry, the actuator receiving control signals from the control circuitry;
 a transducer operably coupled to the control circuitry;
 an armature supporting the transducer over the disc, the armature including:
 a load beam coupled to the actuator such that energization of the actuator displaces the load beam, the load beam having a longitudinal axis and a pair of rails disposed on opposite sides of the longitudinal axis, the load beam including a tongue extending longitudinally from a distal end of the load beam;
 a gimbal coupling the head to the load beam, the gimbal having a mounting portion overlapping a portion of the tongue;
 a first attachment point coupling the mounting portion to the tongue;
 a second attachment point coupling the mounting portion to the tongue; and
 wherein the first attachment point is spaced in a longitudinal direction from the second attachment point, and wherein the rails do not extend substantially beyond the distal end of the load beam.

2. The apparatus of claim 1 wherein the tongue includes a proximal end and a distal end, and the gimbal includes a proximal end and a distal end, and wherein the gimbal is coupled to the tongue such that the proximal end of the gimbal is proximate the proximal end of the tongue.

3. The apparatus of claim 1 wherein the load beam further comprises a mass reducing potion.

4. The apparatus of claim 3 wherein the mass reducing portion of the load beam comprises a partially etched region disposed relatively centrally within the load beam.

5. The apparatus of claim 4 wherein the interconnect comprises a flexible printed circuit.

6. The apparatus of claim 3 wherein the mass reducing portion comprises a hole extending through the load beam, the hole disposed relatively centrally within the load beam.

7. The apparatus of claim 6 wherein the interconnect comprises a plurality of discrete wires.

8. The apparatus of claim 2 and further comprising a lift tab extending transversely from the tongue in a plane defined by the tongue.

9. The apparatus of claim 8 wherein the load beam has a thickness of about 63.5 microns.

10. The apparatus of claim 8 wherein the lift tab extends from the proximal end of the tongue.

11. The apparatus of claim 1 wherein the load beam thickness is within a range from about 50.8 microns to about 63.5 microns.

12. The apparatus of claim 11 wherein the load beam thickness is about 50.8 microns.

13. The apparatus of claim 1 wherein the load beam has a length of about 15.3 mm.

14. The apparatus of claim 1 wherein the attachment points are welds.

15. The apparatus of claim 14 wherein the welds are laser welds.

* * * * *